Patented May 15, 1951

2,553,406

UNITED STATES PATENT OFFICE 2,553,406

PREPARATION OF MALONONITRILES

James K. Dixon, Riverside, Conn., assignor to American Cyanamid Company, New York, N. Y., a corporation of Maine No Drawing. Application April 8, 1950, Serial No. 154,870

4 Claims. (Cl. 260—465.8)

The present invention relates to the preparation of malononitriles.

It is an object of the invention to react a cyanogen halide, such as cyanogen chloride or cyanogen bromide, with an aliphatic monotrile, such as acetonitrile and the like, to prepare a malononitrile. It is a further object of the invention to react aliphatic nitriles with a cayanogen halide at elevated temperatures. Additional objects will be apparent from the discussion hereinafter.

The reaction is preferably carried out at an average reaction tube temperature of at least 600° C., and more preferably at an average temperature within the range 650°–700° C. Higher temperatures may be used but the yields are thereby reduced. In most cases optimum yields will be obtained at an average temperature of about 675° C. The vaporized reactants should be forced through the hot reaction tube at a velocity sufficiently slow to permit reaction, but not so slowly that the materials have an opportunity to decompose. A residence time of at least ½ second at reaction temperature will generally be found necessary, and a residence time of 5–15 seconds is preferred.

The ratio of reactants is not critical, and some of the desired product will be formed even though the mol ratio varies greatly. The reaction is preferably conducted at atmospheric pressure, but superatmospheric pressures can be used if desired.

The following example illustrates without limiting the invention.

Example 1

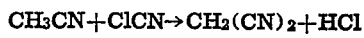

Acetonitrile vapor (3.14 mols) and cyanogen chloride vapor (1.36 mols) were passed into a Pyrex tube heated in an electric furnace. The reaction tube was maintained at an average temperature of 658° C. and the contact time was 6 seconds. The resulting vapor mixture was condensed in a receiver maintained at a temperature of 75° C. which was sufficiently hot to condense acetonitrile and malononitrile while keeping the by-product hydrogen chloride and unreacted cyanogen chloride in the vapor phase. The latter gases were drawn off from the top of the receiver through an alkaline trap which was vented to the atmosphere. In this reaction 0.46 mol of by-product hydrogen chloride were absorbed in the trap. Crude malononitrile together with unreacted acetonitrile was passed into a fractionating column where the acetonitrile was stripped out and recovered for recycling, and the crude malononitrile was taken off at the bottom of the column for refractionation. In this run, 2.54 mols of acetonitrile was recovered unreacted. Slightly less than 0.25 mol of malononitrile was recovered, amounting to slightly less than 18% conversion of the input cyanogen chloride to the nitrile.

Any reaction tube resistant to the relatively high temperatures of the reaction will be suitable, including nickel, quartz, the alloy known as Inconel, and the like. At lower temperatures (such as below 675° C.) Pyrex may be used. Instead of using a hot receiver to keep hydrogen chloride and cyanogen chloride in the vapor phase, all of the gaseous products can be condensed, if desired, followed by distillation to recover the nitrile product, or, if desired, the reaction liquor washd in alkali to remove dissolved hydrogen chloride and cyanogen chloride, followed by fractionation to recover the unreacted acetonitrile and malononitrile product.

Instead of cyanogen chloride, cyanogen bromide can be used equally well.

Aliphatic nitriles other than acetonitrile may be used in the reaction.

While the invention has been described with particular reference to specific embodiments, it is to be understood that it is not to be limited thereto but is to be construed broadly and restricted solely by the scope of the appended claims.

I claim:

1. The method of preparing a malononitrile that comprises heating an aliphatic nitrile with a cyanogen halide of the group consisting of cyanogen chloride and cyanogen bromide at a temperature of at least 600° C. and recovering the thus-formed malononitrile.

2. The method according to claim 1 in which the reaction is carried out at a temperature within the range 650°–700° C., using cyanogen chloride and acetonitrile.

3. The method according to claim 2 in which the cyanogen chloride is in a stoichiometric deficiency.

4. The method of preparing malononitrile that comprises heating acetonitrile and cyanogen chloride in the vapor phase at a temperature of at least 525° C. and recovering malononitrile from the resulting reaction mass.

JAMES K. DIXON.

No references cited.